United States Patent [19]

Shinkai et al.

[11] Patent Number: 5,224,085
[45] Date of Patent: Jun. 29, 1993

[54] OPTICAL RECORDING AND REPRODUCING APPARATUS THAT CANCELS RECORDING OR ERASE MODE IF FOCUS OR TRACKING IS IMPROPER

[75] Inventors: Hiroyuki Shinkai, Kanagawa; Shigeaki Wachi; Susumu Tosaka, both of Tokyo; Sumihiro Okawa, Kanagawa, all of Japan

[73] Assignee: Sony Corporation, Tokyo, Japan

[21] Appl. No.: 474,324

[22] Filed: Feb. 2, 1990

[30] Foreign Application Priority Data

Mar. 3, 1989 [JP] Japan .................................. 1-50094

[51] Int. Cl.⁵ ............................................. G11B 7/00
[52] U.S. Cl. .................................................. 369/44.33
[58] Field of Search ................ 369/44.33, 44.31, 44.25

[56] References Cited

U.S. PATENT DOCUMENTS

| 4,554,652 | 11/1985 | Maeda et al. | 369/44.33 |
| 4,669,072 | 5/1987 | Miura et al. | 369/44.33 |
| 4,730,290 | 3/1988 | Takasago et al. | 369/44.33 |
| 4,759,006 | 7/1988 | Koishi et al. | 369/44.33 |
| 4,794,582 | 12/1988 | Furuyama | 369/44.33 |
| 4,807,210 | 2/1989 | Kaku et al. | 369/44.31 |
| 4,982,392 | 1/1991 | Soejima | 369/44.33 |
| 5,012,461 | 4/1991 | Yoshida et al. | 369/44.33 |

FOREIGN PATENT DOCUMENTS

| 0260722 | 3/1988 | European Pat. Off. . |
| 0302666 | 2/1989 | European Pat. Off. . |
| 326343 | 8/1989 | European Pat. Off. ......... 369/44.33 |
| WO8606201 | 4/1986 | PCT Int'l Appl. .............. 369/44.25 |

OTHER PUBLICATIONS

Patent Abstract of Japan, vol. 6, No. 255 (P-162) Dec. 14, 1982 (Mizuno).

*Primary Examiner*—Donald McElheny, Jr.
*Attorney, Agent, or Firm*—Lewis H. Eslinger; Jay H. Maioli

[57] ABSTRACT

An optical recording and reproducing apparatus comprising an erroneous recording prevention component which prevents this apparatus from making an erroneous recording or erasing operation while it records data on a writable disk. The apparatus is arranged such that, while it is performing a recording or erasing operation, a state of its beam of light just about to go off the control point of tracking and a state of its beam of light just about to go off the control point of focusing are each monitored and, when either of the states is detected, the recording or erasing operation is canceled. Hence, laser power of the beam of light can be controlled before the beam of light completely goes off the control point of tracking, thereby preventing the beam of light from affecting data having been recorded along other tracks.

6 Claims, 3 Drawing Sheets

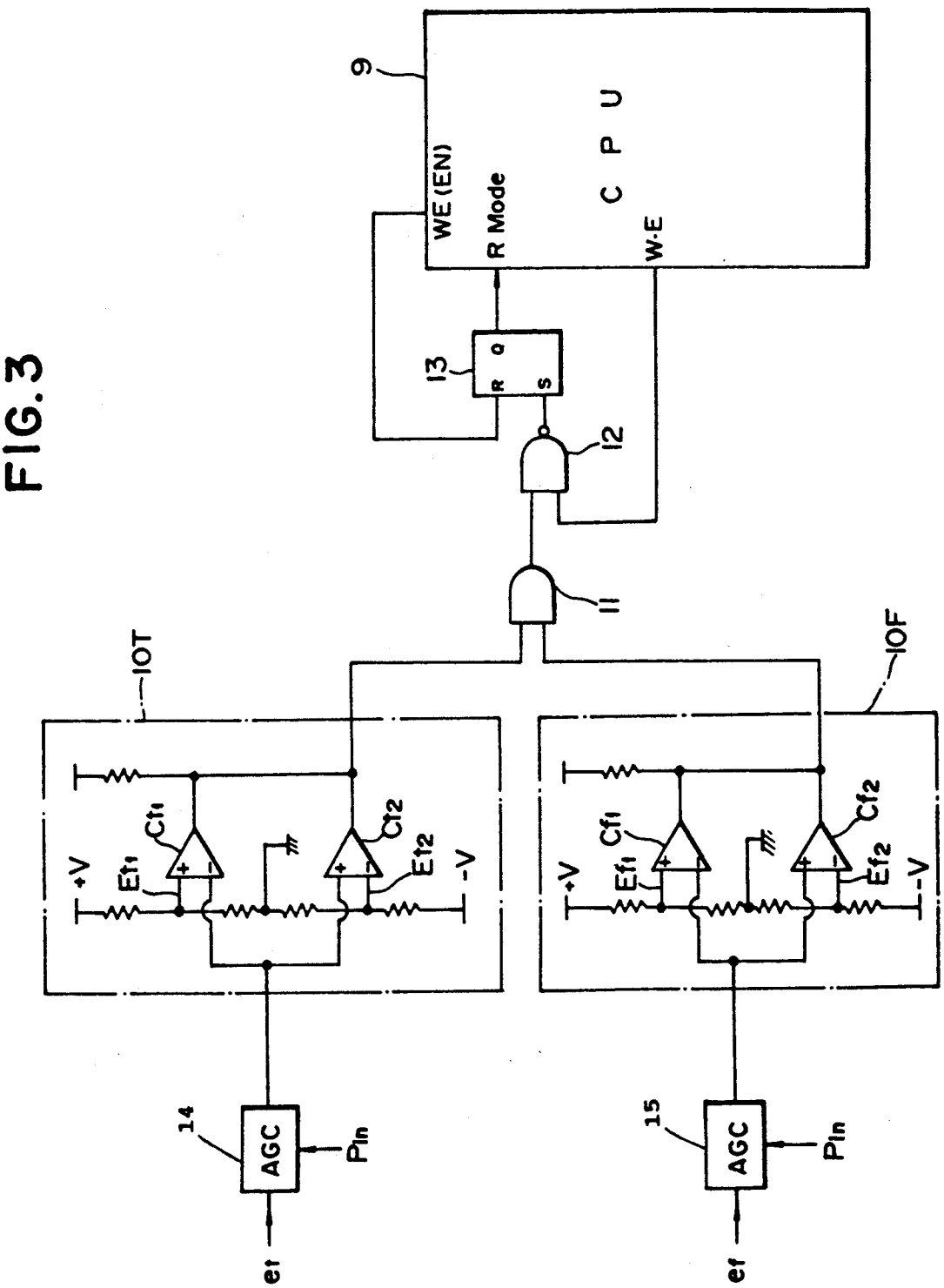

OPTICAL RECORDING AND REPRODUCING APPARATUS THAT CANCELS RECORDING OR ERASE MODE IF FOCUS OR TRACKING IS IMPROPER

BACKGROUND OF THE INVENTION

1. Field of the Invention

The present invention relates to a recording and reproducing apparatus for an optical disk capable of recording data on the optical disk and reading the data therefrom and, more particularly, relates to an erroneous recording prevention system for preventing the apparatus from making an erroneous recording/erasing operation while writing data.

2. Description of the Prior Art

An optical disk, which is provided with a recording medium, whose reflectance varies in response to light, formed on a recording surface of the optical disk and thereby enabled to record information and allow the information to be reproduced, is in practical use.

Such optical disk of an overwritable type is provided, for example, with a spiral track divided into n sectors $S_{C1}, S_{C2}, S_{C3}, \ldots, S_{Cn}$ as shown in FIG. 4, each sector having an address region $AD_1, AD_2, AD_3, \ldots$ at the head portion thereof to record a piece of track address data therein. It is adapted such that, by irradiating the data recording area of each sector $S_{C1}, S_{C2}, S_{C3}, \ldots$ by a laser beam modulated with recording data, the temperature at the irradiated portion is sharply elevated so that recording dots are formed there, or by throwing a laser beam weaker than that used at the time of recording on the recorded area, the information is read out.

Thus, it is arranged such that the laser beam irradiating the optical disk in the recording/erasing mode is provided with laser power several times as high as that for the laser beam in the reading mode. Hence, when the optical recording and reproducing apparatus in the recording/erasing mode was subjected to a strong vibration causing the laser beam to go off the recording/erasing track, such serious accidents sometimes occurred that the data already written in the track were destroyed or new data were written along an incorrect track of the optical disk.

Therefore, it has been considered to provide the apparatus with a component which monitors a tracking error signal and, when a detrack state is detected in the recording mode, the writing operation stops at once, thereby preventing the erroneous recording or erroneous erasing of data.

With the erroneous recording preventing device as described above, however, it sometimes occurs that the laser beam has already deviated a great degree from the on-track position when a detrack state is detected. Thus, there has been a problem with it that positive prevention of the erroneous recording/erasing cannot be assured.

More particularly, when the recording and reproducing apparatus for an optical disk is subjected to a strong shock, the focus servo sometimes comes off the control point, or it becomes unstable, before or at the same time as the detrack occurs. Then, the level of the tracking error signal itself may have already been lowered. Therefore, even if the tracking error signal is constantly monitored by a level comparison element or the like, it may be difficult to correctly detect occurrence of the detrack.

Further, when an out-of-focus state is brought about in the recording mode of erasing mode, the laser beam converged on the optical disk may be spread to cover other track regions and, hence, problems occur such that the recorded data on the optical disk are destroyed and, in the reading mode, many error data are produced.

SUMMARY OF THE INVENTION

The present invention was made in view of these problems in the prior art, and accordingly, a primary object of the present invention is to provide an optical recording and reproducing apparatus in which erroneous recording and erroneous erasing are prevented from occurring.

It is another object of the present invention to provide an optical recording and reproducing apparatus in which destruction of data recorded along other tracks are prevented from occurring.

It is a further object of the present invention to provide an optical recording and reproducing apparatus adapted to stop its data recording operation before the recording beam comes off the track completely.

To achieve the above enumerated objects, the optical recording and reproducing apparatus according to the present invention comprises a detrack detection element for detecting a state of the level of a tracking error signal having deviated outside a predetermined range and a defocus detection element for detecting a state of the level of a focus error signal having deviated outside a predetermined range, wherein it is arranged such that, if either of the above two states is detected while the apparatus is performing a data recording or erasing operation, the recording or reproducing operation is caused to stop.

BRIEF DESCRIPTION OF THE DRAWINGS

FIG. 3 is a circuit diagram showing an example of detrack and defocus detection elements.

DESCRIPTION OF THE PREFERRED EMBODIMENTS

Figure 1:
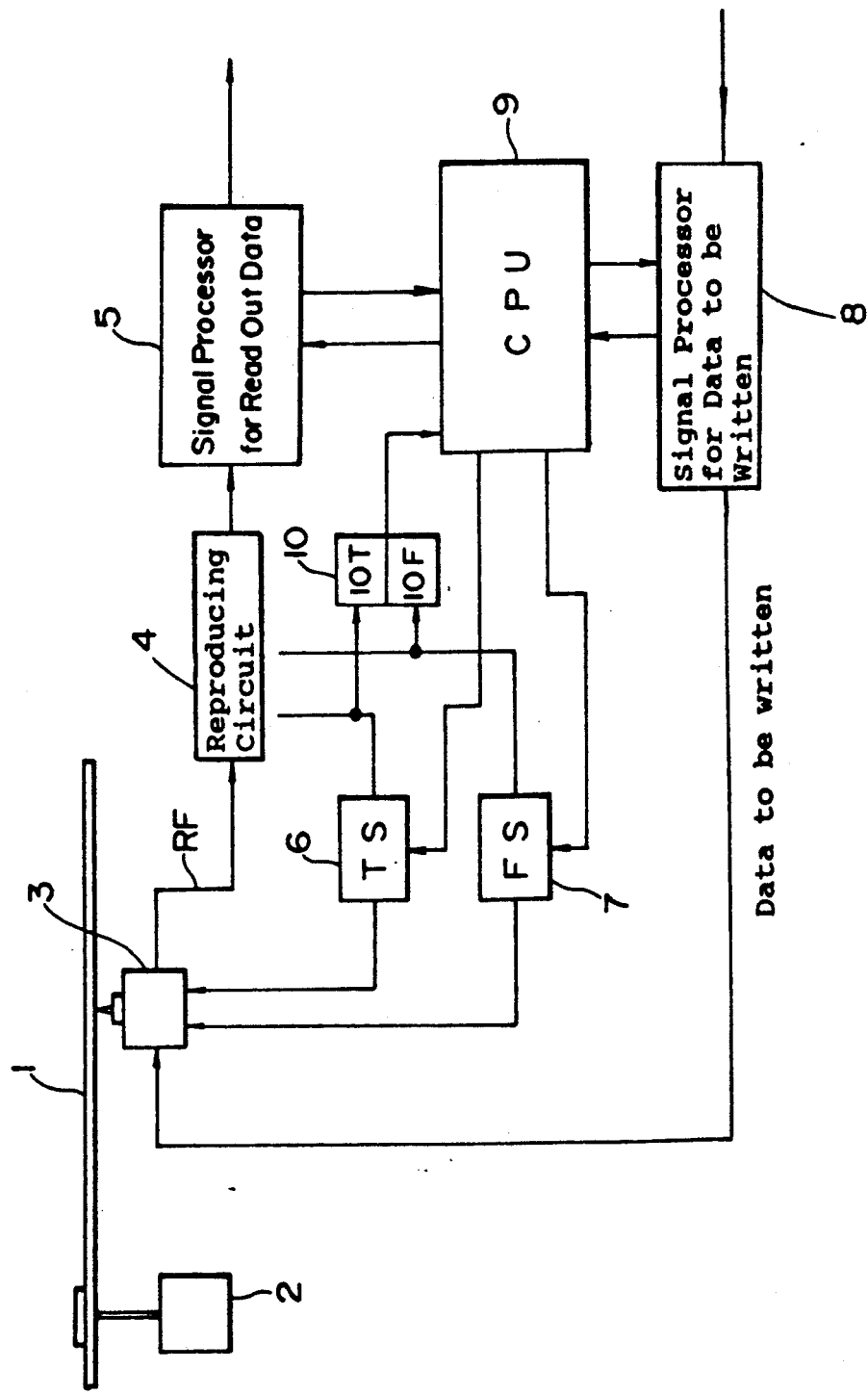
FIG. 1 is a block diagram showing an outline of an optical recording and reproducing apparatus according to the present invention.

FIG. 1 is a block diagram showing the principal portion of a recording and reproducing apparatus for the optical disk of the present invention, in which an optical disk 1 is rotationally driven by a spindle motor 2.

An optical head 3 projecting a laser beam on the optical disk 1 and enabled to write data which is also read out data written on the optical disk 1, is provided, as well known, with such parts as is a laser beam source, an optical element for permitting the laser beam to converge on a recording surface of the optical disk 1, and a photosensor for detecting a reflected beam from the optical disk 1. It is further provided with a focus actuator to cause the converted laser beam to irradiate the optical disk 1 at the focal spot and a tracking actuator (not shown) to move the laser beam so as to follow the track of the optical disk 1.

An RF reproducing circuit portion 4 amplifies a reproduced RF signal obtained from the optical head 3 and, at the same time, extracts a tracking error signal and a focus error signal from the reproduced RF signal and a read out signal process 5 performs signal processing of reproduced data.

The tracking error signal detected by the RF reproducing circuit portion 4 is supplied to the tracking actuator through a tracking servo circuit 6 and, likewise, the focus error signal is supplied to the focus actuator through a focus servo circuit 7.

A signal processor for data to be written 8, at the time of recording, converts data into a predetermined code and supplies it to the optical head 3 in synchronism with a timing clock and a control unit (CPU) 9 performs controlling for various signals according to recording, reproducing, and erasing modes of the optical disk.

A beam detection component 10 is made up of a detrack detection element 10T for detecting a detrack state and a defocus detection element 10F for detecting a defocus state, and the two detection elements are each provided with a comparator for comparing the level of a reference voltage and the error signal as described later.

The optical disk of the present invention is enabled to prevent occurrence of erroneous erasing and erroneous recording by virtue of the above mentioned beam detection component 10 as described below.

Figure 2A:
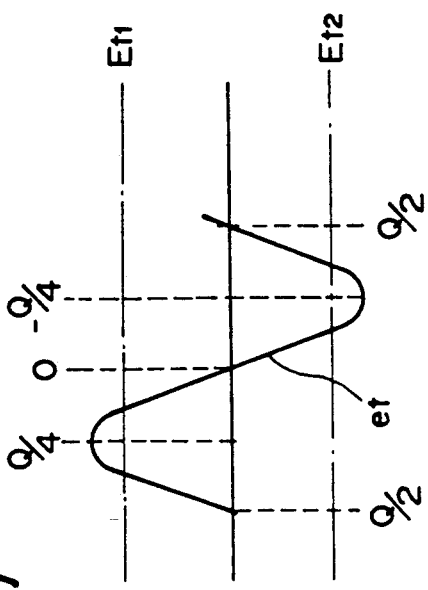
FIG. 2(a) and FIG. 2(b) are explanatory drawings of a tracking error signal.
Figure 2B:
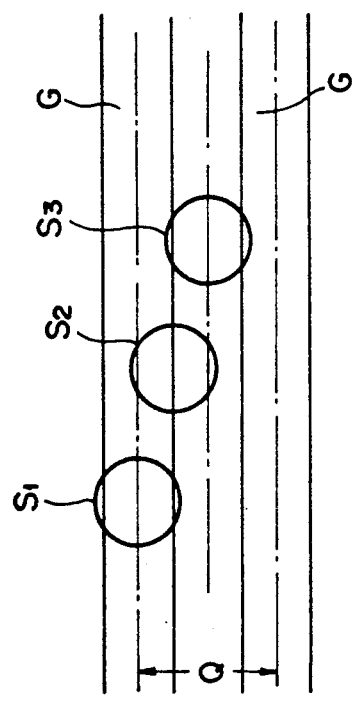
Figure 4:
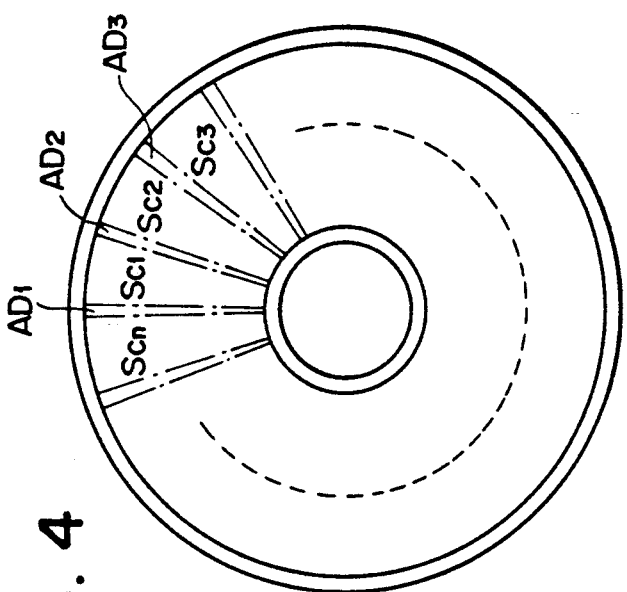
FIG. 4 is an explanatory drawing of a writable optical disk.

The tracking error signal or the focus error signal generally varies in an S-shaped curve as described, for example, in U.S. Pat. Nos. 4,502,134 and 4,059,841. As shown in FIG. 2(a) and FIG. 2(b), for example, the value of the tracking error signal becomes zero when the position of a light beam S projected on a track G of an optical disk is in an on-track state $S_1$, the tracking error signal exhibits its maximum error value in a state $S_2$ where the light beam S is one fourth the track pitch Q, i.e., Q4, off the on-track position, and it again becomes zero when the light beam S is brought to a state $S_3$ in the middle of the track pitch Q, i.e., Q/2 off the on-track position.

Then, by providing, as shown in FIG. 3, the detrack detection element 10T so that the tracking error signal et is input through an AGC amplifier 14 to two comparators Ct1 and Ct2 thereof for comparison with reference voltages Et1 (+) and Et2 (−) which are smaller than the maximum error signal, the detrack state of the laser beam can be detected before it goes Q/4 off the on-track position.

Likewise, by providing the defocus detection means 10F so that the focus error signal ef is input through an AGC amplifier 15 to two comparators Cf1 and Cf2 thereof for comparison with reference voltages Ef1 (+) and Ef2 (−), which are slightly smaller than the focus error signal at the time just before the beam is brought to a defocus state, the state of the focus servo immediately before going off the control point can be detected.

Outputs of the two detection means 10T and 10F are passed through an AND gate 11 to provide a logical product output, which is then input to a NAND gate 12.

The other input to the NAND gate 12 is held at the H level in the recording or erasing mode and, hence, when a signal is detected in either of the detrack and defocus detection elements during the recording/erasing mode, the Q terminal of a flip-flop circuit 13 goes to the H level, whereby the control unit 9 cancels the recording/erasing mode of the recording and reproducing apparatus for optical disk.

Further, at the same time as the cancellation of the recording/erasing mode, the optical recording and reproducing apparatus is forcibly brought to the reading mode.

As a result, the level of the laser power irradiating the optical disk 1 is lowered so that the recorded data on the optical disk can be protected.

When converted to the reading mode, the apparatus monitors the address signal. If the state where the address signal is normally output is restored, it means that the servo circuit has restored its normal operating status. Thereupon, the apparatus is returned to the original writing or erasing mode by a reset signal output from the control unit 9.

In the optical recording and reproducing apparatus of the present invention as described in the foregoing, both the tracking error signal and the focus error signal are monitored by the detrack detection element and the defocus detection element, and control is performed such that, when a signal is output from either of these detection means, the recording/erasing mode is canceled, or the optical recording and reproducing apparatus is forced to change its mode to the reading mode. Therefore, it is ensured that the laser power is lowered when the detrack occurs while the apparatus is in the recording or erasing mode, whereby such effects are obtained that data already recorded can be protected and data to be recorded are positively recorded at a predetermined track address.

What is claimed is:

1. An optical recording and reproducing apparatus capable of recording and/or erasing data on a writable optical disk, said apparatus comprising:
   focus servo means having focus error detection means for producing an output for focus servo control of a beam of light;
   tracking servo means having tracking error detection means for producing an output for tracking servo control of the beam of light;
   detrack detection means for detecting whether a level of said tracking error signal deviates outside a predetermined range;
   defocus detection means for detecting whether a level of said focus error signal deviates outside a predetermined range;
   control means responsive to said detrack detection means and said defocus detection means and operable while said apparatus is in a mode of recording and/or erasing data, for canceling said recording and/or erasing mode when one of said tracking error signal and said focus error signal is detected to be outside the respective predetermined range.

2. An optical recording and reproducing apparatus according to claim 1, wherein said detrack detection means detects a detrack state by comparing said tracking error signal with a positive and a negative reference level smaller than a maximum error signal.

3. An optical recording and reproducing apparatus according to claim 1, wherein said defocus detection means detects a defocus state by comparing said focus error signal with a positive and a negative reference level smaller than a maximum error signal.

4. An optical recording and reproducing apparatus according to claim 1, wherein, while said apparatus is in a mode of recording and/or erasing data, said control means changes the mode to a mode capable of reproducing data when one of said tracking error signal and focus error signal is detected to be outside the respective predetermined range.

5. An optical recording and reproducing apparatus according to claim 4, wherein said drive control means controls laser power of said beam of light.

6. An optical recording and reproducing apparatus according to claim 4, wherein said apparatus further comprises:

address monitor means for detecting whether the mode has been changed by said drive control means to the mode capable of reproducing data and, thereupon, detecting an address signal recorded on said disk; and means for detecting whether said address signal is obtained by said address monitor means and, thereupon, resetting the mode to the mode capable of recording and/or erasing.

* * * * *